United States Patent [19]

Van Tyne, Sr.

[11] Patent Number: 5,042,076
[45] Date of Patent: Aug. 20, 1991

[54] PROGRAMMABLE OPTICAL CHARACTER RECOGNITION

[75] Inventor: Richard G. Van Tyne, Sr., Richardson, Tex.

[73] Assignee: ElectroCom Automation, Inc., Arlington, Tex.

[21] Appl. No.: 598,747

[22] Filed: Oct. 17, 1990

Related U.S. Application Data

[60] Continuation of Ser. No. 279,333, Dec. 2, 1988, abandoned, which is a division of Ser. No. 110,935, Oct. 20, 1987, abandoned.

[51] Int. Cl.⁵ .............................................. G06K 9/20
[52] U.S. Cl. ...................................... 382/50; 382/51; 382/52; 382/53; 382/54
[58] Field of Search ................. 382/51, 50, 52, 53, 382/54, 48; 358/101, 107

[56] References Cited

U.S. PATENT DOCUMENTS

| | | | |
|---|---|---|---|
| 3,930,231 | 12/1975 | Henrichon, Jr. et al. | 340/146.3 |
| 4,119,946 | 10/1978 | Taylor | 340/146.3 |
| 4,162,481 | 6/1979 | DuVall | 382/52 |
| 4,259,661 | 3/1981 | Todd | 340/146.3 |
| 4,288,782 | 9/1981 | Bader et al. | 340/146.3 |
| 4,292,622 | 9/1981 | Henrichon, Jr. | 340/146.3 |
| 4,325,117 | 4/1982 | Parmet et al. | 364/200 |
| 4,345,314 | 8/1982 | Melamud et al. | 382/51 |
| 4,415,880 | 11/1983 | Scott | 382/27 |
| 4,425,626 | 1/1984 | Parmet et al. | 364/900 |
| 4,430,748 | 2/1984 | Tuhro et al. | 382/50 |
| 4,490,848 | 12/1984 | Beall et al. | 381/121 |
| 4,491,961 | 1/1985 | Sutton et al. | 382/41 |
| 4,493,105 | 1/1985 | Beall et al. | 382/21 |
| 4,499,595 | 2/1985 | Masaitis et al. | 382/9 |
| 4,514,622 | 4/1985 | Wevelsiep et al. | 235/463 |
| 4,595,997 | 6/1986 | Parmet et al. | 364/900 |
| 4,623,782 | 11/1986 | Faber | 235/379 |
| 4,625,330 | 11/1986 | Higgins | 382/27 |
| 4,628,532 | 12/1986 | Stone et al. | 382/21 |
| 4,630,308 | 12/1986 | Hongo | 382/27 |
| 4,675,744 | 6/1987 | Mason | 382/54 |

Primary Examiner—Michael Razavi
Attorney, Agent, or Firm—Harold E. Meier

[57] ABSTRACT

An improved Optical Character Recognition System (OCRS) is taught using programmable logic devices to implement the mathematical algorithms that are used to make the black/white and related decisions. The programmable logic devices include, but are not limited to, Programmable Read Only Memories (PROMs), Erasable Read Only Memories (EPROMs), Electrically Erasable Programmable Read Only Memories (EEPROMs), and Field Progammable Logic Arrays (FPLAs).

5 Claims, 3 Drawing Sheets

PROGRAMMABLE OPTICAL CHARACTER RECOGNITION

CROSS-REFERENCE TO RELATED APPLICATIONS

This application is a continuation of application Ser. No. 07/279,333 filed Dec. 2, 1988, now abandoned, which is a continuation of application Ser. No. 07/110,935, filed Oct. 20, 1987, now abandoned.

FIELD OF INVENTION

This invention relates to Optical Character Recognition Systems (OCRS) of the type that read printed or typed data.

BACKGROUND OF THE INVENTION

Optical Character Recognition Systems (OCRS) have become increasingly useful :or reading data in a wide variety of applications. Portable OCRS are used by store clerks to read pricing and inventory numbers from the price tags of merchandise. Stationary OCRS are used to sort the large volumes of incoming mail received by banks, credit institutions, taxing authorities, postal services, and department stores and to store information from other documents, in digital form, in a memory device. Such stationary OCRS must be capable of reading information on the envelopes or other documents at a very fast rate with a high degree of accuracy.

The vast majority of data that is read by an OCRS is comprised of a black character—of varying shades—against a white background—also of varying shades. The data may be comprised of other, colored data or backgrounds other than white. However, the data will be dark or "black" with respect to the lighter or "white" background. For the purposes of this application, the term "black" will be used to refer to the data, and the term "white" will be used to refer to the background, it being understood that any other colors may be used as long as the data is dark with respect to a lighter background.

In order for an OCRS to recognize or read any given character, it is crucial that the OCRS accurately distinguish the color black from the color white. The OCRS then match the shape or outline of the black characters with a library of known, stored characters to determine which character has been read.

There are several popular types of OCRS. One type uses an array of photoelectric sensors or pixels to scan a line of print. Each sensor emits an analog signal corresponding to the amount of light reflected by the scanned paper back to the sensor. These analog signals are converted into a digital form of 'ones' and 'zeros' corresponding to the colors 'white' and 'black'. The purpose of this conversion is to create a high contrast, digital image of the signal for presentation to the recognition unit of the OCRS.

The determination as to whether a particular pixel is sensing the color "black" or the color "white" is difficult due to the many different shades of "black" and "white" that appear in typed or printed form. Indeed, the "blackness" sensed by one pixel may differ from that sensed by an adjacent pixel even thought both pixels are sensing the same character. Also, the same pixel may sense different degrees of 'blackness' or 'whiteness' in the same document or in different documents. These variations are caused by unevenness in the printing of the characters by differences in the sensors themselves and by unevenness of the surface or the position of the document being read and differences in the documents themselves.

Many ways have been developed to make the decision as to whether a pixel is sensing a portion of a black character or a portion of a white background. One way is to compare the value sensed by the pixel with the values sensed by surrounding pixels to determine its relative "blackness" or "whiteness".

Regardless of which procedure is used, this crucial "black/white" decision often requires the use of a series of decision points or algorithms. These algorithms are often very complex. Regardless of which algorithm is used, there will always be some data that is not readable or is incorrectly read by the OCRS.

To improve the reading accuracy, manufacturers of OCRS are continually re-evaluating and changing these decision algorithms in an attempt to achieve higher degrees of accuracy. Unfortunately, it is often difficult and expensive to change the decision algorithms since they are typically implemented with discrete logic connected by printed wiring. To change the algorithms requires a modification to the printed wiring using etch cut and jumper techniques if the change is simple or re-layout of the printed circuit board if the change is extensive. It is therefore desirable to decrease the time and expense involved in changing the black/white decision algorithms.

SUMMARY OF THE INVENTION

An improved Optical Character Recognition System (OCRS) is described using programmable logic devices to implement the mathematical algorithms that are used to make the black/white and related decisions. The programmable logic devices include, but are not limited to, Programmable Read Only Memories (PROMs), Erasable Read Only Memories (EPROMs), Electrically Erasable Programmable Read Only Memories (EEPROMs), and Field Programmable Logic Arrays (FPLAs).

In a preferred OCRS embodiment, the programmable logic devices are used to implement the following functions:

(1) to analyze how much change, if any, should be made to the upper reference voltage of an Analog-to-Digital Converter;

(2) to establish an appropriate white background value in the horizontal direction for each pixel so that horizontally ordered differences may be normalized;

(3) to produce a modulated signal corresponding to the scanned data by comparing the pixel value with the background value and outputting a value proportional to their relationship; and (4) to provide a dynamic threshold value used to determine whether a given pixel is black or white.

The above list is merely representative of a few uses of programmable logic devices to implement algorithms in an OCRS. The use of programmable logic devices to implement other algorithms as well is still within the contemplated scope of the present invention.

It is a feature of the present invention to provide an improved OCRS that enables decision algorithms to be readily and inexpensively changed.

It is another feature of the present invention to use programmable logic devices to implement decision algorithms in an OCRS.

IN THE DRAWINGS

DETAILED DESCRIPTION

Figure 1:
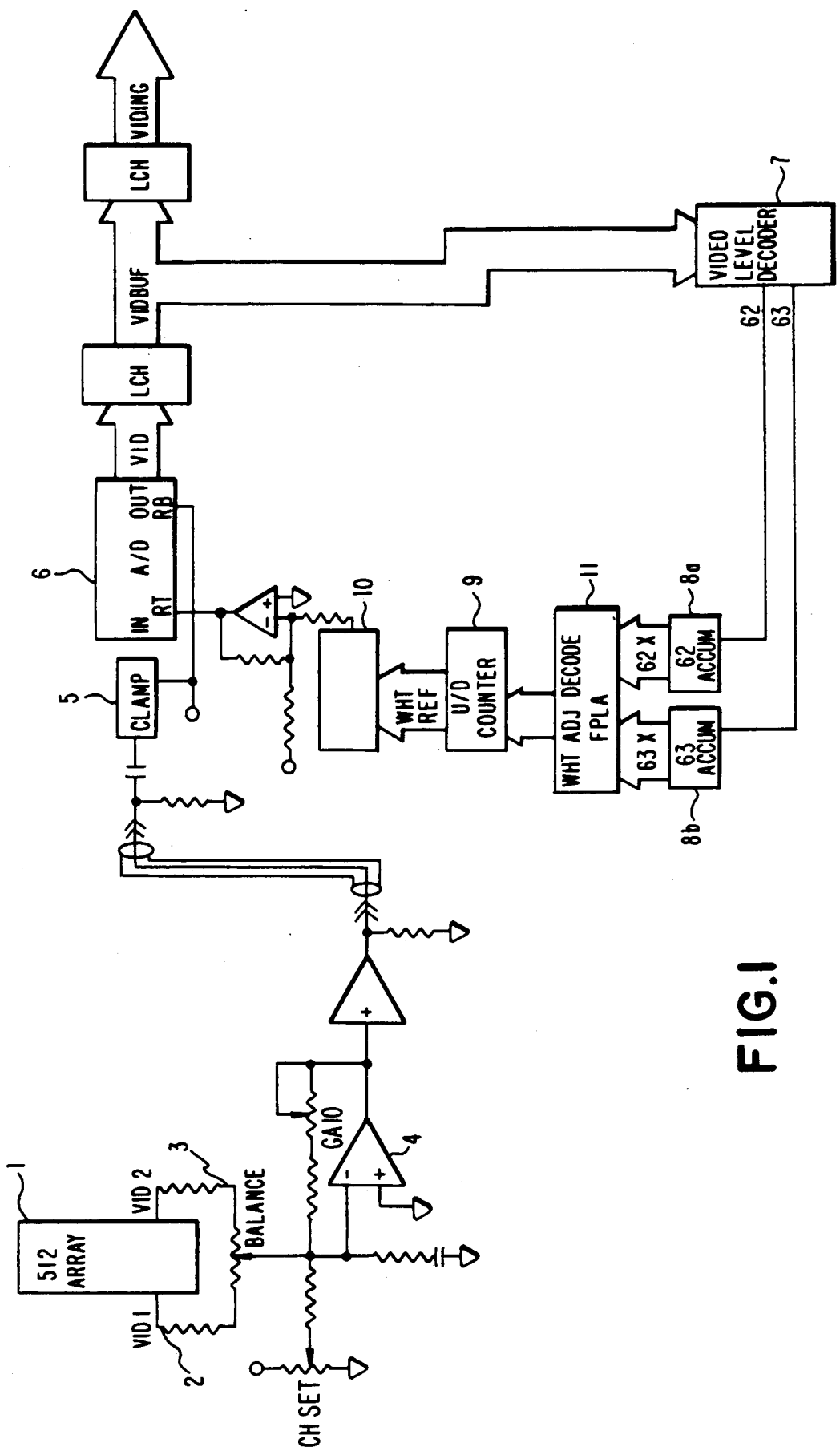
FIG. 1 is a flow diagram of the Array circuit and the Vertical Automatic Gain Control (VAGC) circuit in an OCRS according to the present invention.
Figure 2:
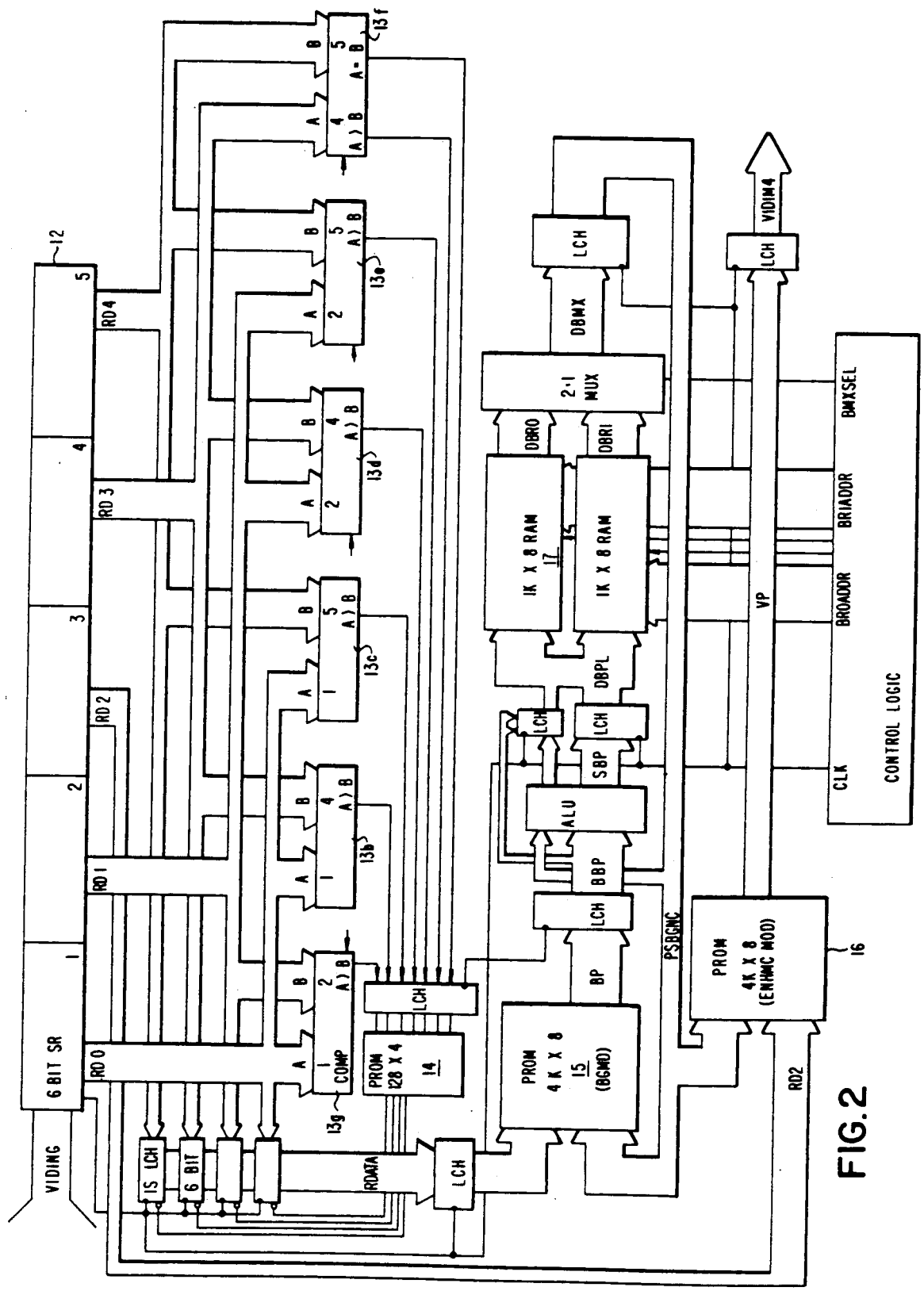
FIG. 2 is a flow diagram of a Horizontal Automatic Gain Control (HAGC) circuit in an OCRS according to the present invention.
Figure 3:
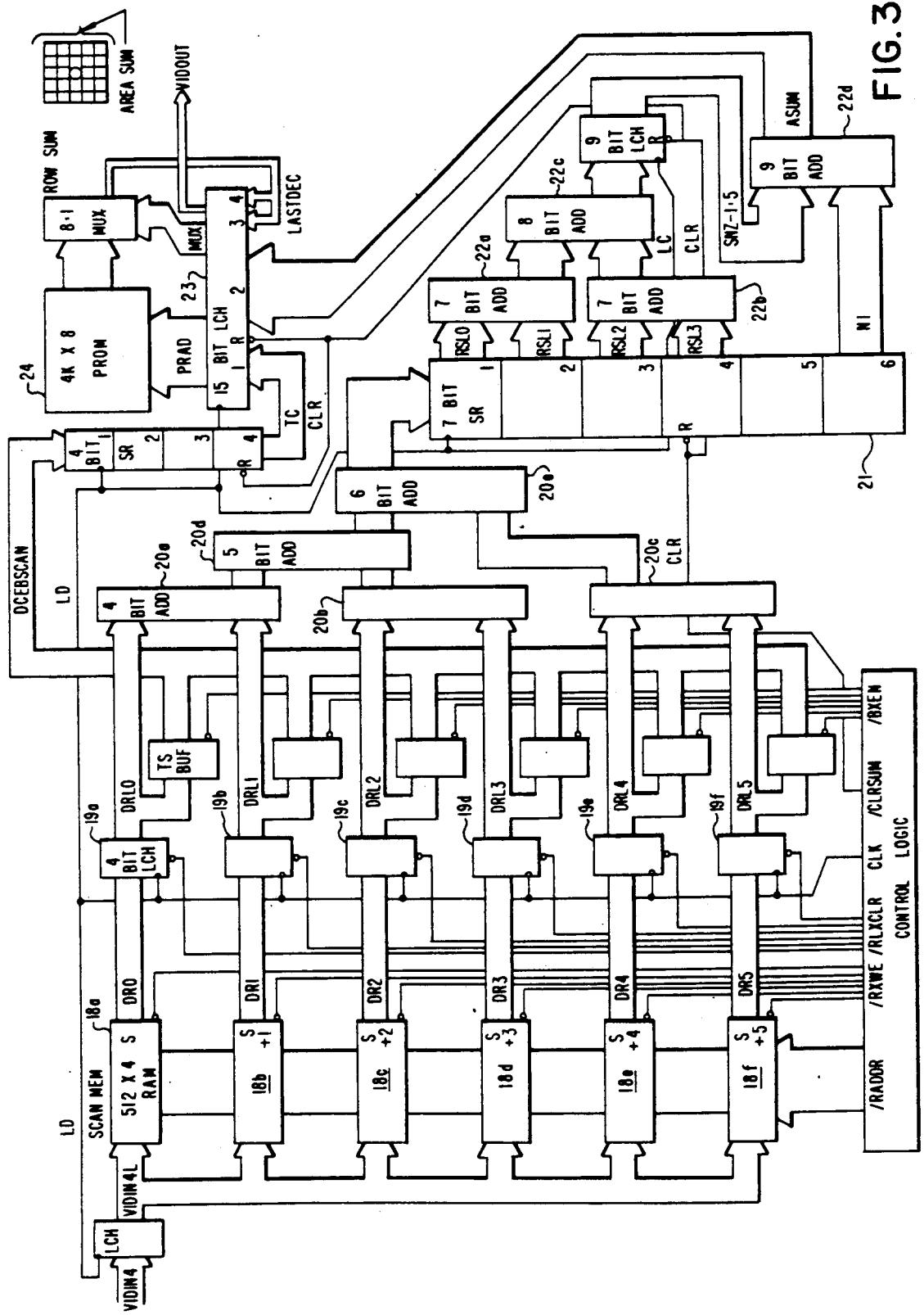
FIG. 3 is a flow diagram of a Black/White (B/W) decision circuit in an OCRS according to the present invention.

A preferred embodiment of an OCRS according to the present invention consists of four printed circuit (PC) boards and the optical equipment needed to capture the data to be read using a 1 by 512 element CCD array. The PC boards are identified as: (1) the Array circuit (FIG. 1); (2) the Video Automatic Gain Control (VAGC) circuit (FIG. 1); (3) the Horizontal Automatic Gain Control (HAGC) circuit (FIG. 2); and (4) the Black/White (B/W) decision circuit (FIG. 3).

A brief description of these circuits is as follows.

The Array circuit contains the CCD array chip, an amplifier for adjusting the gain and the balance of the odd and even video signals, and TTL-to-MOS clock-/timing generators for driving the CCD array.

The VAGC circuit contains the logic to provide the basic timing signals to all four circuits. It also converts the analog video signal sensed by the Array circuit into 6-bit digital values that are normalized. The VAGC circuit also assigns a value of 63 for the maximum white (background) value encountered in one scan of the data being read.

The HAGC circuit calculates the maximum white (background) value sensed by each pixel in a horizontal direction. Additional circuitry converts the 6-bit digital video value for each pixel produced by the VAGC circuit, to a 4-bit value that represents the proportional relationship of the 6-bit value to its associated background value.

The B/W circuit calculates the average of the 25 pixels in a 5 by 5 matrix surrounding the test pixel. This average value is compared to the test pixel's value, and a "black/white" decision is made. If the test pixel's value is less than the average value, the test pixel is called "black".

As more fully discussed below, the mathematical computations made in the VAGC, HAGC, and B/W circuits are performed by using programmable logic devices. These devices include, but are not limited to, Programmable Read Only Memories (PROMs), and Field Programmable Logic Arrays (FPLAs). This feature allows the mathematical algorithms to be changed and enhanced without modifying the individual circuits. The programmable logic device is removed and replaced with a new one that contains the new algorithm. This feature also permits non-linear algorithms to be used.

I. The Array Circuit

The power and three input signals are supplied to the Array circuit from the VAGC circuit via a 26 conductor flat ribbon cable. The analog video signal is output from the Array Circuit to the VAGC circuit via a 50 ohm coaxial cable.

Referring to FIG. 1, the three input signals are converted from TTL level to MOS level logic for driving CCD array 1.

Three terminal voltage regulators (not shown) are mounted on the Array Circuit to provide voltages other than ±12 volts.

There are two video output lines from the Array Circuit, odd cells and even cells. These video output signals are a series of voltage levels which represent the amount of light each cell has collected during the scan interval. The wave form is a 50% duty cycle pulse for each cell on both the odd and even drain lines. The 50% duty cycle pulses are 180 degrees out of phase, and are combined into one amplifier creating a signal (double rate) video output line.

Analog amplifier 4 has adjustments for changing the gain and balancing the two video output signals transmitted via lines 2 and 3. The analog video level should be adjusted via the balance adjustment for minimum odd/even noise at the black level. The gain should be adjusted for a 1.0 volt modulation between the dark reference cells and the white paper or background. The DC range of this 1.0 volt modulation should be $-1.5$ volts to $-0.5$ volts at the coaxial cable.

II. The VAGC Circuit

This circuit generates the basic clock signals for the OCRS and converts the analog video signal into a 6-bit digital value.

The basic oscillator frequency is generated by a 27 MHz oscillator when the transporter that transports documents past the scanner is not running, and a phased lock looped circuit which tracks the belt speed encoder pulses when the transporter is running. This switcher is controlled by a transporter motor-on signal.

FPLA 11 used in the VAGC circuit analyzes the results of two accumulators 8a and 8b to determine how much change, if any, should be made to the upper reference voltage of an Analog-to-Digital converter 6.

The purpose of this function is to ensure that the whitest pixel elements within each scan will be assigned a value of 63 by converter 6 (for a 6-bit converter), regardless of the relative brightness of those white pixels.

Referring again to FIG. 1, the analog video signal is first sent to a clamping circuit 5 that sets the dark reference cell level to $-1.0$ volts. This same $-1.0$ volt reference is used to set the bottom reference of A/D converter 6. This causes the 6-bit A/D output to have a decimal weight of "0" for black.

The value of every pixel element is monitored at the output of Analog to Digital converter 6 by a video level decoder 7 during each scan interval. The number of pixel elements having the value of 62 and 63 are accumulated by separate, pre-loadable, accumulators 8a and 8b. Accumulator 8a is incremented when a value of 62 occurs. Accumulator 8b is incremented when a value of 63 occurs. Each accumulator can be preset to look for a minimum value. When the minimum value is reached, it ceases to accumulate and outputs a Terminal Count (TC) bit.

The count 63 accumulator 8b should be preset to a larger value than count 62 accumulator 8a, typically 32 for accumulator 8b and 4 for accumulator 8a.

At the end of the scan interval the final value and "Terminal Count bit" of each of these accumulators is analyzed by FPLA 11.

In a preferred embodiment, the following decision points or algorithms may be used to determine whether the background or white level will be changed:

| ACCUMULATOR | FINAL VALUE | TC PRESET | GAIN CHANGE |
|---|---|---|---|
| count 63 (accumulator 8b) & | 1111 1111 | yes | |
| count 62 (accumulator 8a) | 1111 1111 | yes | no change |
| count 63 & | 1111 1111 | yes | |
| count 62 | 1111 1110 | no | decrease by 1 |
| count 62 | 1111 110x | no | decrease by 2 |
| count 62 | 1111 10xx | no | decrease by 4 |
| count 62 | 1111 0xxx | no | decrease by 8 |
| count 62 | 1110 xxxx | no | decrease by 16 |
| count 62 | 110x xxxx | no | decrease by 16 |
| count 62 | 10xx xxxx | no | decrease by 16 |
| count 62 | 0xxx xxxx | no | decrease by 16 |
| count 63 | 1111 1110 | no | increase by 1 |
| count 63 | 1111 110x | no | increase by 2 |
| count 63 | 1111 10xx | no | increase by 4 |
| count 63 | 1111 0xxx | no | increase by 8 |
| count 63 | 110x xxxx | no | increase by 16 |
| count 63 | 10xx xxxx | no | increase by 16 |
| count 63 | 0xxx xxxx | no | increase by 16 |

NOTE:
"x" means the value does not matter.

The amount and direction of the change derived from the analysis by FPLA 11 is sent to up/down counter 9 which in turn drives Digital to Analog converter (D/A) 10. Converter 10 generates an upper reference voltage for the A/D converter 6. The upper reference voltage is 0.0 volts if the counter value of up/down counter 9 is 0, and −0.5 volts if the counter value is 255.

The determination to adjust the upper reference voltage of A/D converter 6 is made at the end of each scan. The adjustment, if any, is made during the times that the document passes the 16 inactive cells of array 1 in each scan.

The video output of the VAGC circuit is a 6-bit digital value, where the whitest cell value is "63" and the darkest cell value is "0" for documents having a normalized reflectance range of 1.0 to 0.5 (assuming 1.0=white, and 0.0=black).

The determinations made by the VAGC circuit may be modified by changing the preset values of accumulators 8a and 8b, and by changing the contents of FPLA 11 thereby affording dynamic gain control of the OCRS as a function of the information collected during the previous scan.

III. HAGC Circuit

There are three PROMS used in this circuit which provide the computational power. Referring to FIG. 2, a first PROM 14 selects which of five adjacent pixel values in the vertical direction is whitest and establishes it as the new background value (A). A second PROM 15 compares this new background value with the previous background value (B) calculated for that same vertical location and outputs a present background value (D). A third PROM 16 produces a 4bit (0–15) video level which is proportional to the ratio of the background calculation for each pixel and the present 6-bit (0–63) video level of that pixel.

1. New Background Value Calculation

The PROM used in this subcircuit compares the present determination of the background (white) value with the background value established for that same pixel during the previous scan.

The purpose of this function is to establish an appropriate white background value in the horizontal direction for each pixel so that horizontally ordered differences can be normalized out of the video signals. The output from this subcircuit is a 6-bit background value for each signal.

Referring to FIG. 2, the present background value for a pixel element is derived by testing the values of the pixel elements located in register 12 using comparators 13a through 13f. PROM 14 is used to select the highest of the values (most white) as the present background value.

This present background value is compared by PROM 15 to the previous background value read from Random Access Memory (RAM) 17 that was generated for that same pixel element during the prior scan.

A "new" background value is calculated by PROM 15 according to the following algorithm:

ASSUME:
(present background) = A
(previous background) = B
(new background) = D
(accumulator) = C
IF:   A>B then D = (A+B)/2 ; set C = 3
A<B and C>O then D = B ; set C = C−1
A<B and C=O then D = B−1

2. Modulation Enhancement

The modulation enhancement PROM 16 converts the 6-bit background value and the current 6-bit video signal value into a 4-bit proportional value.

The purpose of this function is to produce maximum modulation in the video signal.

In a preferred embodiment, a 6-bit pixel value that is equal to, or greater than, the background value is converted to a 4-bit value of 15. A 6-bit pixel value that is less than the previous background value is converted to a 4-bit value (0–15) proportional to the 6-bit video value background value.

The mathematical algorithms resident within the any of PROMS may be linear or non-linear and are easily modified to optimize system performance without reworking the printed circuit board.

IV. Black/White Decision Circuit

The function of this circuit is to compare the value of the center pixel with those of the 24 pixels that surround it in a 5×5 matrix, and the previous value of the center pixel. This is accomplished by adding up the 4-bit values of the surrounding 24 pixels and the previous value for the center pixel, and comparing that "area sum" to 25 times the value of the center pixel. If the area sum is greater than 25 times the center cell, then the center pixel is call "black". If the area sum is less than 25 times the center pixel, the center pixel is called "white".

Referring now to FIG. 3, the 4-bit value for each pixel is loaded into RAM buffers 18a–18f to accumulate five complete scans of data. Data for the same pixel element from five scans is loaded into latches 19a–19f, combined into a 5×5 area sum by adders 22a-22d, and then loaded in latch 23.

The decision to set a particular pixel to a 1-bit value (black=1, or white=0) is made by comparing, in PROM 24, the 4-bit value of that pixel with the combined sum of a 5×5 matrix of pixels whose center is that particular pixel. Included as part of this decision is the 1-bit value of the previous pixel.

The actual computation are defined by the mathematical algorithm resident within PROM 24. It may have linear or non-linear functions that are easily modified to optimize performance without reworking the printed circuit board.

What is claimed is:

1. Optical character recognition apparatus responsive to data on a document appearing in various shades of grey on a light background to determine that a pixel element represents data or background, comprising:

a Vertical Automatic Gain Control (VACC) circuit including an analog to digital converter for generating a digital signal for each pixel element on a scan by scan, document by document basis, the digital signal varying from a reference level to an adjustable upper level, means for monitoring the value of the digital signal for each pixel element and for accumulating the upper level value of each pixel element in a scan on a scan by scan basis, and programmable means for receiving an algorithm to adjust the output of said analog to digital converter for generating in response to the accumulated upper level values for all the pixel elements in a scan;

a Horizontal Automatic Gain Control (HAGC) circuit receiving the digital signal from said Vertical Automatic Gain Control (VAGC) circuit and including means responsive to the digital signal for one pixel element and preselected adjacent pixel elements to establish a scan background value, and means for comparing the scan background value with a previous scan background value to establish a present background value for each pixel element on a scan by scan basis wherein the present background value based in part on the previous background value for the same pixel element in the previous scan; and black/white decision making means connected to said HAGC circuit for producing an output identifying each pixel element in a scan as containing data or background.

2. Optical recognition apparatus as set forth in claim 1, including means for scanning the document to include pixel elements in a predetermined pattern.

3. Optical character apparatus as set forth in claim 2 wherein the algorithm of said programmable means controls the adjustment of the output of said analog to digital converter for generating at the end of a scan of the predetermined pattern.

4. Optical character recognition apparatus as set forth in claim 1, wherein the digital signal includes a preselected number of bits and said HAGC circuit includes means for converting the preselected number of bits from a first number of bits to a second number of bits, less than the first number.

5. Optical character recognition apparatus as set forth in claim 1 wherein said analog-to-digital converter includes an adjustable gain, and wherein the gain is adjusted at the end of each scan based on the accumulated upper level values for each pixel element for a complete scan.

* * * * *